(12) United States Patent
Karaki et al.

(10) Patent No.: US 8,019,224 B2
(45) Date of Patent: Sep. 13, 2011

(54) COMMUNICATIONS DEVICE

(75) Inventors: Isuke Karaki, Yokohama (JP); Makoto Inoguchi, Nishitokyo (JP); Michihiro Nagaishi, Okaya (JP)

(73) Assignee: Seiko Epson Corporation (JP)

( * ) Notice: Subject to any disclaimer, the term of this patent is extended or adjusted under 35 U.S.C. 154(b) by 737 days.

(21) Appl. No.: 12/056,508

(22) Filed: Mar. 27, 2008

(65) Prior Publication Data

US 2008/0240722 A1    Oct. 2, 2008

(30) Foreign Application Priority Data

Mar. 28, 2007  (JP) .................. 2007-083677
Jan. 21, 2008  (JP) .................. 2008-010097

(51) Int. Cl.
*H04B 10/04* (2006.01)
*H04B 10/10* (2006.01)

(52) U.S. Cl. ...................... 398/115; 398/191
(58) Field of Classification Search .......... 398/115–117, 398/189–191
See application file for complete search history.

(56) References Cited

U.S. PATENT DOCUMENTS

| | | | |
|---|---|---|---|
| 5,659,883 A * | 8/1997 | Walker et al. | 455/59 |
| 6,188,496 B1 * | 2/2001 | Krishna et al. | 398/177 |
| 7,356,019 B2 * | 4/2008 | Hirt et al. | 370/347 |
| 2002/0122231 A1 * | 9/2002 | Verbana et al. | 359/145 |
| 2004/0208591 A1 * | 10/2004 | Willebrand et al. | 398/115 |
| 2007/0025739 A1 * | 2/2007 | Moore et al. | 398/202 |

FOREIGN PATENT DOCUMENTS

| | | |
|---|---|---|
| JP | 08-065269 | 3/1996 |
| JP | 2000-023246 | 1/2000 |
| JP | 2001-230686 | 8/2001 |
| JP | 2004-294310 | 10/2004 |
| JP | 2006-217015 | 8/2006 |
| JP | 2006-319408 | 11/2006 |

* cited by examiner

*Primary Examiner* — Leslie Pascal
(74) *Attorney, Agent, or Firm* — Harness, Dickey & Pierce, P.L.C.

(57) ABSTRACT

A transmission device that includes: a radio signal transmission processing section that transmits a radio carrier wave overlaid with transmitting information after being modulated by pulse position modulation; an optical signal transmission processing section that transmits an optical carrier wave overlaid with the transmitting information after being modulated by the pulse position modulation; and a baseband processing section that modulates the transmitting information in accordance with the pulse position modulation of shared use with the radio signal transmission processing section and the optical signal transmission processing section.

1 Claim, 2 Drawing Sheets

COMMUNICATIONS DEVICE

BACKGROUND

1. Technical Field

The present invention relates to a communications device and method and, more specifically, to a transmission device, a reception device, a transfer device, a transmission method, a reception method, and a transfer method using radio carrier waves and optical carrier waves.

2. Related Art

Light, infrared ray to be precise, has been used for communications between transmission and reception devices of previous type, e.g., between a mobile phone and a car navigation system as described in Patent Document 1 (JP-A-2004-294310) Between a device disposed at a place for maintenance and a server device, communications has been performed by cable, by radio, by infrared ray, or others as described in Patent Document 2 (JP-A-2006-217015), and between a mobile phone and any other information equipment, communications has been performed using a visible light source, e.g., backlight such as liquid crystal panel, as described in Patent Document 3 (JP-A-2006-319408).

The issue here is that the above transmission and reception devices of previous type perform communications only by either light or radio. In this case, if any trouble occurs on an optical transmission path during communications by light, this results in a difficulty or an impossibility to continue the communications by light. Similarly, if any trouble occurs on a radio transmission path during communications by radio, this results in a difficulty or an impossibility to continue the communications by radio.

SUMMARY

An advantage of some aspects of the invention is to provide a transmission device, a reception device, a transfer device, a transmission method, a reception method, and a transfer method of the following configurations in Application Examples 1 to 12.

Application Example 1

A transmission device of Application Example 1 includes: a radio signal transmission processing section that transmits a radio carrier wave overlaid with transmitting information after being modulated by pulse position modulation; an optical signal transmission processing section that transmits an optical carrier wave overlaid with the transmitting information after being modulated by the pulse position modulation; and a baseband processing section that modulates the transmitting information in accordance with the pulse position modulation of shared use with the radio signal transmission processing section and the optical signal transmission processing section.

Application Example 2

A reception device of Application Example 2 includes: a radio signal reception processing section that receives a radio carrier wave overlaid with receiving information after being modulated by pulse position modulation; an optical signal reception processing section that receives an optical carrier wave overlaid with the receiving information after being modulated by the pulse position modulation; and a baseband processing section that demodulates the receiving information in accordance with the pulse position modulation of shared use with the radio signal reception processing section and the optical signal reception processing section.

With the transmission device of Application Example 1 and the reception device of Application Example 2, the baseband processing section modulates the transmitting information or demodulates the receiving information in accordance with the pulse position modulation of shared use with the radio signal transmission processing section and the optical signal transmission processing section. As such, even if any trouble occurs to either the radio signal transmission processing section or the optical signal transmission processing section, the remaining can continuously perform communications.

Moreover, there is no more need to provide the baseband processing section to each of the radio signal transmission processing section and the optical signal transmission processing section, and to each of the radio signal reception processing section and the optical signal reception processing section. This accordingly enables to reduce the size and cost of the transmission device and the reception device.

Application Example 3

A transfer device of Application Example 3 includes: a radio signal reception processing section that receives a radio carrier wave overlaid with transferring information after being modulated by pulse position modulation; and an optical signal transmission processing section that transmits an optical carrier wave overlaid with the transferring information after being modulated by the pulse position modulation.

Application Example 4

A transfer device of Application Example 4 includes: an optical signal reception processing section that receives an optical carrier wave overlaid with transferring information after being modulated by pulse position modulation; and a radio signal transmission processing section that transmits a radio carrier wave overlaid with the transferring information after being modulated by the pulse position modulation.

With the transfer devices of Application Examples 3 and 4, information being the modulation result by the pulse position modulation is transferred through reception and transmission. This accordingly enables to transfer the information without using the baseband processing section provided to the transmission device of Application Example 1 and the reception device of Application Example 2.

Application Example 5

A transmission method of Application Example 5 includes: transmitting a radio carrier wave overlaid with transmitting information after being modulated by pulse position modulation; transmitting an optical carrier wave overlaid with the transmitting information after being modulated by the pulse position modulation; and modulating the transmitting information in accordance with the pulse position modulation of shared use with the transmitting the radio carrier wave and the transmitting the optical carrier wave.

Application Example 6

A reception method of Application Example 6 includes: receiving a radio carrier wave overlaid with receiving information after being modulated by pulse position modulation; receiving an optical carrier wave overlaid with the receiving information after being modulated by the pulse position modulation; and demodulating the receiving information in accordance with the pulse position modulation of shared use with the receiving the radio carrier wave and the receiving the optical carrier wave.

Application Example 7

A transfer method of Application Example 7 includes: receiving a radio carrier wave overlaid with transferring information after being modulated by pulse position modulation; and transmitting an optical carrier wave overlaid with the transferring information after being modulated by the pulse position modulation.

Application Example 8

A transfer method of Application Example 8 includes: receiving an optical carrier wave overlaid with transferring information after being modulated by pulse position modulation; and transmitting a radio carrier wave overlaid with the transferring information after being modulated by the pulse position modulation.

Application Example 9

A transmission device of Application Example 9 includes: a radio signal transmission processing section that performs modulation processing related to transmission of a radio signal by radio waves; an optical signal transmission processing section that performs modulation processing related to transmission of a signal by light; and a baseband signal processing section that applies same baseband signal processing to both the radio signal transmission processing section and the optical signal transmission processing section.

Application Example 10

In the transmission device of Application Example 9, the transmission device of Application Example 10 further includes: a display section that includes a light source, and the optical signal transmission processing section performs the modulation processing related to transmission of a signal by light using the light source.

Application Example 11

A reception device of Application Example 11 includes: a radio signal reception processing section that performs demodulation processing related to reception of a radio signal by radio waves; an optical signal reception processing section that performs demodulation processing related to reception of a signal by light; and a baseband signal processing section that applies same baseband signal processing to both the radio signal reception processing section and the optical signal reception processing section.

Application Example 12

In the reception device of Application Example 11, in the reception device of Application Example 12, the optical signal reception processing section performs the demodulation processing related to reception of a signal by light using a light source included in a display section.

BRIEF DESCRIPTION OF THE DRAWINGS

The invention will be described with reference to the accompanying drawings, wherein like numbers reference like elements.

DESCRIPTION OF EXEMPLARY EMBODIMENT

Transmission Device

Figure 1:
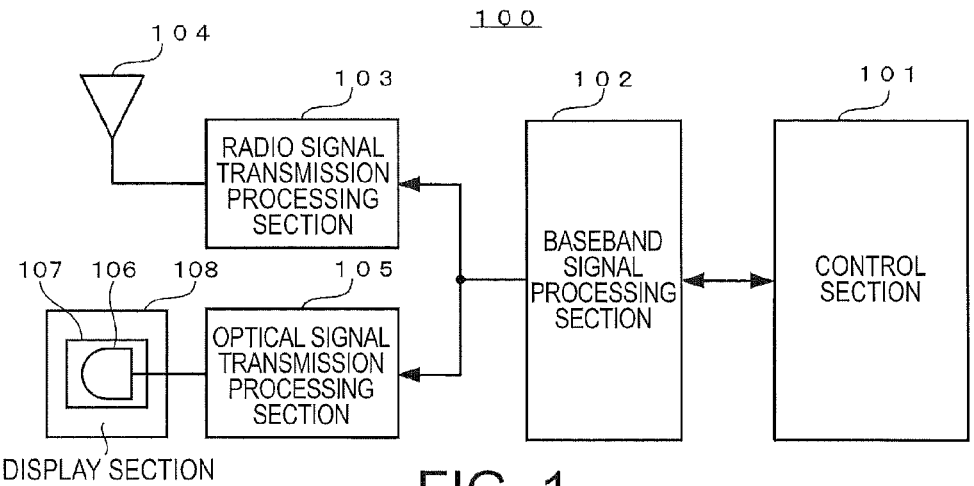
FIG. 1 is a diagram showing the configuration of a transmission device of an embodiment.

FIG. 1 shows the configuration of a transmission device of an embodiment. A transmission device (communications device) 100 is configured to include, as shown in FIG. 1, an antenna 104, a radio signal transmission processing section 103, an optical signal transmission processing section 105, a baseband signal processing section 102, a control section 101, and a display section 108.

The display section 108 is provided with a liquid crystal display panel 107, and the liquid crystal display panel 107 is provided with an LED (Light-Emitting Diode) 106 serving as a light source. The display section 108 displays thereon the transmission operation of the transmission device 100, for example.

Outline Description

The radio signal transmission processing section 103 transmits, toward a reception device opposed thereto (not shown), a radio carrier wave via the antenna 104. The radio carrier wave is the one overlaid with transmitting information, i.e., data, after being modulated by pulse position modulation (PPM).

The optical signal transmission processing section 105 transmits an optical carrier wave toward the above-described reception device via the LED 106. The optical carrier wave is the one overlaid with information same as the information that is supposed to be transmitted by the radio signal transmission processing section 103, i.e., the information modulated by the PPM described above.

The baseband processing section 102 modulates the information that is supposed to be transmitted by the radio signal transmission processing section 103 and the optical signal transmission processing section 105. This modulation is performed in accordance with the above-described PPM, i.e., in accordance with the PPM applied to both the radio signal transmission processing section 103 and the optical signal transmission processing section 105.

The control section 101 monitors and controls the entire operation of the transmission device 100, and forwards the transmitting information to the baseband signal processing section 102.

In the transmission device 100, the baseband signal processing section 102 modulates the transmitting information in accordance with the PPM applied to both the radio signal transmission processing section 103 and the optical signal transmission processing section 105. As such, even if any trouble occurs to either the radio signal transmission processing section 103 or the optical signal transmission processing section 105, the remaining section can keep operating for transmission. What is good, there is no need to provide the baseband signal processing section 102 to each of the radio signal transmission processing section 103 and the optical signal transmission processing section 105. This accordingly enables to reduce the size and cost of the transmission device 100 compared with a transmission device equipped, with no choice, with two of the baseband signal transmission section 102.

Detailed Description

The communications device 100 is configured mainly by a microprocessor, for example, and is provided with the control section 101 for collectively controlling the entire system of the communications device 100. The control section 101 handles transmitting data of various forms, e.g., audio, image, and digital data whatever that can be a transmitting target.

That is, this control section 101 is provided with various types of data in the form of digital data from an input system, input operation means, and others that are not shown. Thus provided data is then subjected to any predetermined processing in the control section 101, and the result is forwarded to the baseband signal processing section 102.

The baseband signal processing section 102 then applies any predetermined processing to the transmitting data provided by the control section 101, and generates a baseband signal suitable for the communications mode in the communications device 100.

The baseband signal generated as such in the baseband signal processing section 102 is forwarded to the radio signal transmission processing section 103. In the radio signal transmission processing section 103, the baseband signal is then subjected to modulation related to transmission of a radio signal by radio waves.

The output from the radio signal transmission processing section 103, i.e., a modulation signal in the RF (Radio Frequency) band, is forwarded to the antenna 104, and then is propagated to the outside from the antenna 104 as radio waves.

The baseband signal generated by the baseband signal processing section 102 is forwarded also to the optical signal processing section 105. In the optical signal transmission processing section 105, the baseband signal is then subjected to modulation related to transmission of a signal by light.

Based on the output from the optical signal transmission processing section 105, the LED 106 serving as optical projection means is driven, and the light emission of the LED 106 is then projected to the outside as a signal of the modulated light.

In such a communications device 100, the baseband signal processing section 102 is provided for shared use by the radio signal transmission processing section 103 being in charge of modulation related to transmission of a radio signal by radio waves, and the optical signal transmission processing section 105 being in charge of modulation related to transmission of a signal by light. Such a configuration enables to considerably reduce the circuit size compared with the configuration of including the baseband signal processing section to each of the radio signal transmission processing section 103 and the optical signal transmission processing section 105.

Alternatively, the radio signal transmission processing section 103 can be so configured as to perform modulation related to transmission of a radio signal by pulse communications. If this is the configuration, pulse communications (transmission) is performed using radio signals by radio waves in response when the radio signal transmission processing section 103 is operated.

The optical signal transmission processing section 105 can be also configured as to perform optical communications utilizing the light source of a display device. If this is the configuration, optical communications (transmission) is performed using the light source of the display device in response when the optical signal transmission processing section 105 is operated.

Reception Device

Figure 2:
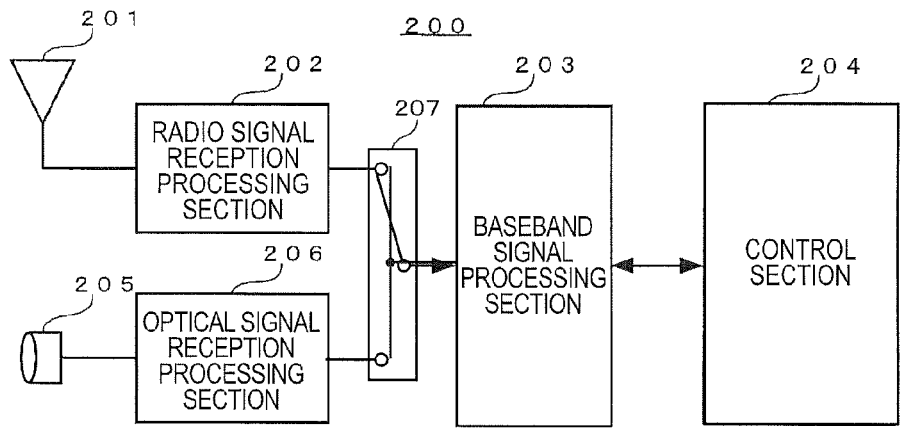
FIG. 2 is a diagram showing the configuration of a reception device of the embodiment.

FIG. 2 shows the configuration of a reception device of the embodiment. The reception device (communications device) 200 is configured to include, as shown in FIG. 2, an antenna 201, a radio signal reception processing section 202, a switching section 207, a light-receiving element 205, an optical signal reception processing section 206, a baseband signal processing section 203, and a control section 204.

Outline Description

The radio signal reception processing section 202 receives, from a transmission device opposed thereto (not shown), a radio carrier wave via the antenna 201. The radio carrier wave is the one overlaid with receiving information, i.e., data, after being modulated by the PPM described above.

The optical signal reception processing section 206 receives an optical carrier wave from the above-described transmission device via the light-receiving element 205. The optical carrier wave is the one overlaid with information same as the information that is supposed to be received by the radio signal reception processing section 202, i.e., the information modulated by the PPM described above.

The switching section 207 selects either the radio carrier wave received by the radio signal reception processing section 202, or the optical carrier wave received by the optical signal reception processing section 206. Thus selected carrier wave is then forwarded to the baseband signal processing section 203.

The baseband signal processing section 203 modulates the carrier wave provided by the switching section 207 in accordance with the above-described PPM, i.e., in accordance with the PPM applied to both the radio signal reception processing section 202 and the optical signal reception processing section 206 so that the receiving information is derived.

The control section 204 monitors and controls the entire operation of the reception device 200, and receives the receiving information from the baseband signal processing section 203.

In the reception device 200, the baseband signal processing section 203 modulates the receiving information in accordance with the PPM applied to both the radio signal reception processing section 202 and the optical signal reception processing section 206. As such, even if any trouble occurs to either the radio signal reception processing section 202 or the optical signal reception processing section 206, the remaining section can keep operating for reception. What is good, there is no need to provide the baseband signal processing section 203 to each of the radio signal reception processing section 202 and the optical signal reception processing section 206. This accordingly enables to reduce the size and cost of the reception device 200 compared with a reception device equipped, with no choice, with two of the baseband signal transmission section 203.

Detailed Description

The reception signal received by the antenna 201 by radio waves is forwarded to the radio signal reception processing section 202 for demodulation, and then is converted into an IF (Intermediate Frequency) signal, for example. The radio signal reception processing section 202 is equipped with a low-noise amplifier (not shown) in the preceding stage, for example.

The signal as a result of demodulation by the radio signal reception processing section 202 is forwarded to the baseband signal processing section 203, and is restored to baseband data, e.g., digital data.

The data restored to baseband data as such in the baseband signal processing section 203 is supplied to the control section 204, and then is subjected to processing for display and storage of data.

Note here that the control section 204 is configured mainly by a microprocessor, for example, and collectively controls the entire system of the communications device 200.

The light-receiving element 205 is provided for serving as a photoreceptor for receiving a communications signal by light. An optical signal received by such a light-receiving element 205 is supplied to the optical signal reception processing section 206.

The signal being a result of demodulation by the optical signal reception processing section 206 is supplied to the baseband signal processing section 203, and then is restored to baseband data, e.g., digital data.

In such a communications device 200, the baseband signal processing section 203 is provided for shared use by the radio signal reception processing section 202 being in charge of demodulation related to reception of a radio signal by radio waves, and the optical signal reception processing section 206 being in charge of demodulation related to reception of a signal by light. Such a configuration enables to considerably reduce the circuit size compared with the configuration of including the baseband signal processing section to each of the radio signal reception processing section 202 and the optical signal reception processing section 206.

Alternatively, the radio signal reception processing section 202 can be so configured as to perform demodulation related to reception of a radio signal by pulse communications. If this is the configuration, pulse communications (reception) is performed using radio signals by radio waves in response when the radio signal reception processing section 202 is operated.

The optical signal reception processing section 206 can be also embodied to perform optical communications through reception of a modulation light utilizing the light source of a display device. If this is the configuration, optical communications (reception) is performed through reception of a modulation light using the light source of the display device in response when the optical signal reception processing section 206 is operated.

Transmission/Reception Device

Figure 3:
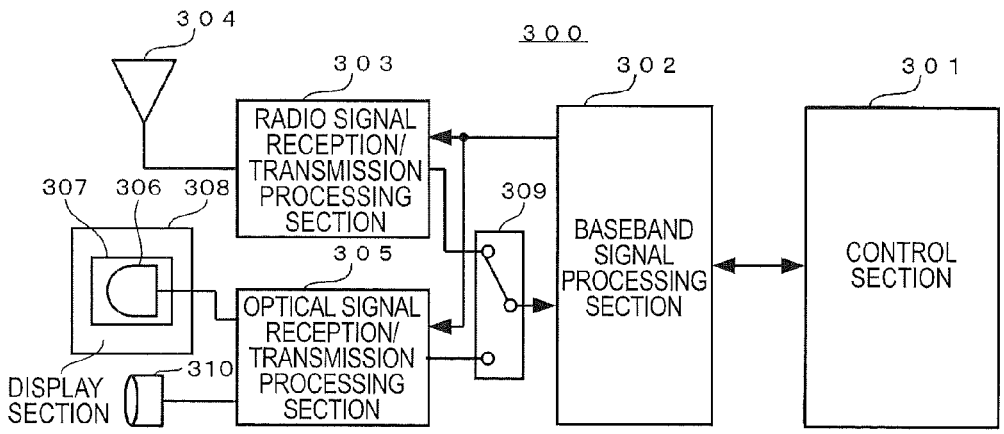
FIG. 3 is a diagram showing the configuration of a transmission/reception device of the embodiment.

FIG. 3 shows the configuration of a transmission/reception device of the embodiment. A transmission/reception device (communications device) 300 is embodied as a communications device that is capable of both transmission and reception.

First of all, described are the configuration and effects of the communications device 300 in order of the processing procedure of a signal (data) when the communications device 300 performs the function of transmission.

The communications device 300 is configured mainly by a microprocessor, for example, and is provided with a control section 301 for collectively controlling the entire system of the communications device 300. The control section 301 handles transmitting data of various forms, e.g., audio, image, and digital data whatever that can be a transmitting target.

That is, this control section 301 is provided with various types of data in the form of digital data from an input system, input operation means, and others that are not shown. Thus provided data is then subjected to any predetermined processing in the control section 301, and the result is forwarded to a baseband signal processing section 302.

The baseband signal processing section 302 then applies any predetermined processing to the above-described transmitting data provided by the control section 301, and generates a baseband signal suitable for the communications mode in the communications device 300.

The baseband signal generated as such in the baseband signal processing section 302 is forwarded to a radio signal reception/transmission processing section 303. In the radio signal reception/transmission processing section 303, the baseband signal is then subjected to modulation related to transmission of a radio signal by radio waves.

The output from the radio signal reception/transmission processing section 303, i.e., a modulation signal in the RF (Radio Frequency) band, is forwarded to the antenna 304, and then is propagated to the outside from the antenna 304 as radio waves.

The baseband signal generated by the baseband signal processing section 302 is forwarded also to the optical signal reception/transmission processing section 305. In the optical signal reception/transmission processing section 305, the baseband signal is then subjected to modulation related to transmission of a signal by light.

Based on the output from the optical signal reception/transmission processing section 305, an LED 306 provided to a liquid crystal panel 307 inside of a display section 308 is driven, and the light emission of the LED 306 is then projected to the outside as a signal of the modulated light.

Herein, the components, i.e., the display section 308, the liquid crystal panel 307, and the LED 306, respectively correspond to the components of FIG. 1, i.e., the display section 108, the liquid crystal panel 107, and the LED 106.

Described next are the configuration and effects of the communications device 300 in order of the processing procedure of a signal (data) when the communications device 300 performs the function of reception.

The reception signal received by the antenna 304 by radio waves is forwarded to the radio signal reception/transmission processing section 303 for demodulation, and then is converted into an IF signal, for example. The radio signal reception/transmission processing section 303 is equipped with a low-noise amplifier (not shown) in the preceding stage, for example.

A light-receiving element 310 is provided for serving as a photoreceptor for receiving a communications signal by light. An optical signal received by such a light-receiving element 310 is supplied to the optical signal reception/transmission processing section 305 for demodulation.

A switching section 309 (corresponding to the switching section 207 of FIG. 2) then selects either the signal through with demodulation by the radio signal reception/transmission processing section 303 or the signal through with demodulation by the optical signal reception/transmission processing section 305. Thus selected signal is then forwarded to the baseband signal processing section 302, and is restored to baseband data, e.g., digital data.

The data restored to baseband data as such in the baseband signal processing section 302 is supplied to the above-described control section 301, and then is subjected to processing for display and storage of data.

In such a communications device 300, the baseband signal processing section 302 is provided for shared use by the radio signal reception/transmission processing section 303 being in charge of modulation and/or demodulation related to reception/transmission of a radio signal by radio waves, and the optical signal reception/transmission processing section 305 being in charge of modulation and/or demodulation related to reception/transmission of a signal by light. Such a configuration enables to considerably reduce the circuit size compared with the configuration of including the baseband signal processing section to each of the radio signal reception/transmission processing section 303 and the optical signal reception/transmission processing section 305.

Alternatively, the radio signal reception/transmission processing section 303 can be so configured as to perform modulation and/or demodulation related to transmission and/or reception of a radio signal by pulse communications. If this is the configuration, pulse communications is performed using radio signals by radio waves in response when the radio signal reception/transmission processing section 303 is operated.

The optical signal reception/transmission processing section 305 can be also configured as to perform optical communications utilizing the light source of a display device (at the time of reception, perform optical communications by receiving modulation lights of a backlight). If this is the configuration, optical communications is performed using the light source of the display device in response when the optical signal reception/transmission processing section 305 is operated.

Transfer Device

Figure 4:
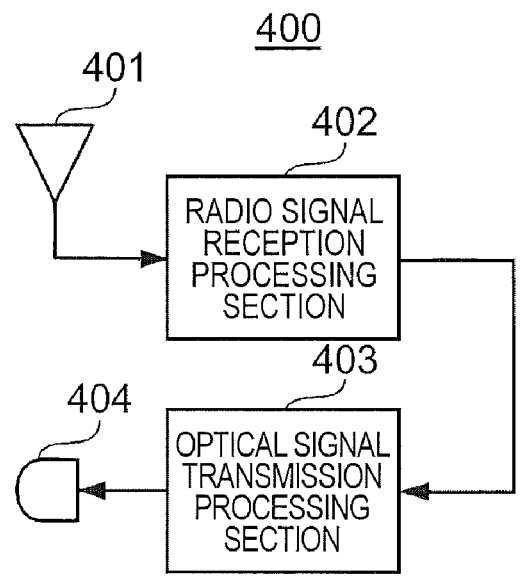
FIG. 4 is a diagram showing the configuration of a transfer device of the embodiment.
Figure 5:
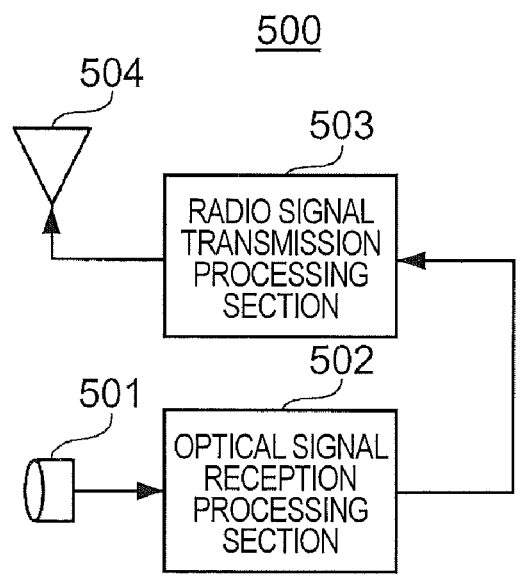
FIG. 5 is a diagram showing the configuration of another transfer device of the embodiment.

FIGS. 4 and 5 each show the configuration of a transfer device of the embodiment. A transfer device 400 is configured to include, as shown in FIG. 4, an antenna 401, a radio signal reception processing section 402, an optical signal transmission processing section 403, and an LED 404. The radio signal reception processing section 402 is of a configuration similar to the radio signal reception processing section 202 of the reception device 200, and has the function similar thereto. The optical signal transmission processing section 403 is of a configuration similar to the optical signal transmission processing section 105 of transmission device 100, and has the function similar thereto. In the transfer device 400 as such, the radio signal reception processing section 402 receives, via the antenna 401, a radio carrier wave overlaid with transfer information after being modulated in accordance with PPM, and the optical signal transmission processing section 403 transmits, i.e., transfers, via the LED 404, an optical carrier wave overlaid with the transfer information after being modulated in accordance with the PPM.

As described above, the transfer device 400 is provided with the radio signal reception processing section 402 for receiving a radio carrier wave overlaid with transfer information after modulation by PPM, and the optical signal transmission processing section 403 for transmitting an optical carrier wave overlaid with the transfer information after modulation by the PPM. Such a configuration enables to perform a transfer process with no need to include the baseband signal processing sections 102 and 203 that are provided in the transmission device 100 and the reception device 200 described above.

As shown in FIG. 5, a transfer device 500 is configured to include a light-receiving element 501, an optical signal reception processing section 502, a radio signal transmission processing section 503, and an antenna 504. The optical signal reception processing section 502 is of a configuration similar to the optical signal reception processing section 206 of the reception device 200, and has the function similar thereto. The radio signal transmission processing section 503 is of a configuration similar to the radio signal transmission processing section 103 of the transmission device 100, and has the function similar thereto. In the transfer device 500, in contrast to the transfer device 400, the optical signal reception processing section 502 receives, via the light-receiving element 501, an optical carrier wave overlaid with transfer information after being modulated in accordance with PPM, and the radio signal transmission processing section 503 transmits, i.e., transfers, via the antenna 504, a radio carrier wave overlaid with the transfer information after being modulated in accordance with the PPM.

As described above, the transfer device 500 is provided with the optical signal reception processing section 502 for receiving an optical carrier wave overlaid with transfer information after modulation by PPM, and the radio signal transmission processing section 503 for transmitting a radio carrier wave overlaid with the transfer information after modulation by the PPM. Such a configuration enables to perform a transfer process with no need to include the baseband signal processing sections 102 and 203 that are provided in the transmission device 100 and the reception device 200 described above.

The technical scope of the invention can be summarized as a communications method that is characterized in that transmission and/or reception of a radio signal by radio waves and transmission and/or reception of a signal by light are both performed by the same baseband signal process.

With this communications method, a circuit of a relatively small size can perform both radio communications by radio waves and optical communications.

The entire disclosure of Japanese Patent Application Nos: 2007-083677, filed Mar. 28, 2007 and 2008-010097, filed Jan. 21, 2008 are expressly incorporated by reference herein.

What is claimed is:

1. A system comprising:
    a transmission device, comprising:
        a control section that generates transmitting information;
        a baseband processing section that generates modulated information by modulating the transmitting information in accordance with pulse position modulation;
        a radio signal transmission processing section that transmits a radio carrier wave overlaid with the modulated information; and
        an optical signal transmission processing section that transmits an optical carrier wave overlaid with the modulated information; and
    a reception device, comprising:
        a radio signal reception processing section that receives a radio carrier wave overlaid with first receiving information;
        an optical signal reception processing section that receives an optical carrier wave overlaid with second receiving information; and
        a baseband processing section that demodulates both the first receiving information and the second receiving information in accordance with pulse position modulation.

* * * * *